UNITED STATES PATENT OFFICE.

ALFRED EINHORN, OF MUNICH, GERMANY, ASSIGNOR TO THE FARB-WERKE, VORMALS MEISTER, LUCIUS & BRÜNING, OF HÖCHST-ON-THE-MAIN, GERMANY.

GLYCOCOL ESTER AND PROCESS OF MAKING SAME.

SPECIFICATION forming part of Letters Patent No. 619,549, dated February 14, 1899.

Application filed December 9, 1898. Serial No. 698,700. (No specimens.)

*To all whom it may concern:*

Be it known that I, ALFRED EINHORN, doctor of philosophy and professor of chemistry, a citizen of the Empire of Germany, residing at Munich, Germany, have invented certain new and useful Improvements in the Manufacture of Glycocol Amidocarbonic Acid Esters, of which the following is a specification.

I have found that from amidocarbonic acids of the aromatic series may be obtained hitherto unknown compounds of valuable properties for medicinal purposes.

The process consists in introducing a halogen-substituted acid radical in the amido group of esters of the said amidocarbonic acids by the action of an acid chlorid, such as chloracetylchlorid, and in then exchanging by the reaction with an amin the halogen atom of the said radical for the residue of an amin.

An immaterial modification of the process is effected if instead of starting from the amidocarbonic esters the amidocarbonic acid itself is transformed in the aforesaid manner and etherified afterward. Without any essential changes monoalkylamidocarbonic acids may also be employed in the process.

If chloracetylchlorid be used as an acid chlorid, the course of the process is expressed by the following formula, wherein "R" represents the bivalent radical of an amidocarbonic acid and "N$x_2$" the residue of a primary or secondary amin:

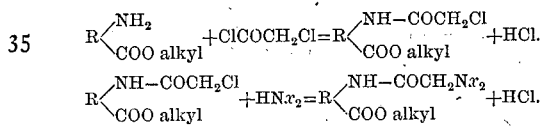

To the final products of the process applies the general formula:

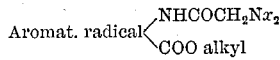

They appear as derivatives of glycocol and may generally be designated as "glycocol amidocarbonic acid esters." They are colorless basic compounds, soluble in water with difficulty, but more easily in benzene, alcohol, and ether. They are decomposed when heated with alkalies and retransformed into the original amido-acid. They form well crystallizing salts, soluble in water with a neutral reaction, and by this distinguish themselves advantageously from the less basic amidocarbonic acid esters, with which they share the property of a local anesthetic power. They are employed as an equivalent for cocaine.

In the process may be employed, for instance, ortho-meta-para-amidobenzoic acids, amido-ortho-meta-para-oxybenzoic acids, and amidocinnamic acid. As amins may be employed primary and secondary amins and the meaning of N$x_2$ in the above formula is to be understood conformably.

I illustrate my process by the following examples:

Example I: Thirty-four parts, by weight, of the methyl ester of para-amido-salicylic acid are dissolved in two hundred and twenty parts, by weight, of benzene and heated with twenty-four parts, by weight, of chloracetylchlorid until there is no further escape of hydrochloric acid. The methyl ester of chloracetyl-para-amidosalicylic acid partly separates, during the reaction and completely on cooling, as a pale violet crystalline mass. It is filtered, washed with benzene, and may be transformed directly. The compound crystallizes from absolute alcohol in laminæ having the melting-point 158° centigrade. Forty-five parts, by weight, of the methyl ester of chloracetyl-para-amidosalicylic acid and twenty-one parts, by weight, of diethylamin are heated in one hundred parts, by weight, of alcohol for two hours in a vessel provided with an inverted condenser. The alcohol is then evaporated, and the residue is treated with a dilute solution of soda and extracted with ether. On distilling off the solvent there remains the methyl ester of diethylglycocol-para-amidosalicylic acid as an oil; its hydrochlorid crystallizes from absolute alcohol in prisms, having the melting-point 185° centigrade. It yields in an aqueous solution with ferric chlorid a violet color.

Example II: One hundred and thirty-seven grams of para-amidobenzoic acid are suspended in about one liter of benzene, to which are added one hundred and twenty grams of chloracetyl chlorid. The mixture is heated on the water-bath for so long as hydrochloric acid escapes. When cooled, it is filtered and the solution is evaporated and the residue is washed with water to remove any still remaining hydrochlorid of para-amidobenzoic acid. On recrystallization from alcohol the point of decomposition of the chloracetyl-para-amidobenzoic acid is at 252° centigrade. 21.3 grams of chloracetyl-para-amidobenzoic acid are heated with a concentrated aqueous solution of 4.5 grams of ethylamin and about fifty grams of alcohol for from two to three hours in a vessel provided with an inverted condenser. On distilling off the alcohol an excess of dilute hydrochloric acid is added to the residue, when the hydrochlorid of ethyl-glycocol (or ethylamidoacetyl) para-amidobenzoic acid, soluble with difficulty in hydrochloric acid, separates. This salt may be purified by recrystallization from little water or by precipitation from the aqueous solution with hydrochloric acid. It decomposes at 285° to 287° centigrade. If the hydrochlorid be warmed with a solution of concentrated sodium acetate, then the free acid separates on cooling, and being purified by recrystallization from water or dilute alcohol decomposes at 260° centigrade.

To produce the methyl ester, the hydrochlorid is suspended in five times the quantity of methyl alcohol containing three per cent. of hydrochloric acid and heated in a vessel provided with an inverted condenser until dissolved. The methyl ester has its melting-point at 105° centigrade and its hydrochlorid at 225° centigrade.

Having now described my invention, what I claim is—

1. The process for the manufacture of aromatic glycocolamidocarbonic-acid esters of the general formula

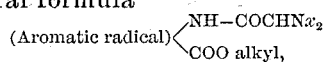

which consists in treating amidocarbonic-acid esters with halogen-substituted acid chlorids and allowing an amin to act upon the resulting halogen-alkyl derivatives, substantially as described.

2. The process for the manufacture of di-ethyl-glycocol-para-amidosalicylic-acid ester, which consists in treating para-amidosalicylic-acid ester with chloracetyl chlorid and in heating the resulting chloracetylamidosalicylic-acid ester with diethylamin, substantially as described.

3. As a new product, the glycocolamidocarbonic-acid ester of the general formula

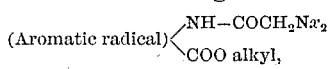

wherein "$Nx_2$" means the residue of a primary or secondary amin, representing colorless compounds, soluble with difficulty in water, with less difficulty, however, in benzene, ether and alcohol, being decomposed when heated with alkalies, and re-forming the original amido-carbonic acid, forming well-crystallizing salts, soluble in water with a neutral reaction.

4. As a new product, the methyl ester of diethyl-glycocol-para-amidosalicylic acid, being a thick colorless oil, soluble with difficulty in water, easily soluble in benzene, ether and alcohol, forming when heated with alkalies, para-amidosalicylic acid, its chlorhydrate crystallizing from alcohol in prisms having the melting-point 184° to 185° centigrade.

In testimony that I claim the foregoing as my invention I have signed my name in presence of two subscribing witnesses.

ALFRED EINHORN.

Witnesses:
EMIL HENZEL,
LERBALLOR LERASIN.